Patented Apr. 6, 1937

2,075,839

UNITED STATES PATENT OFFICE 2,075,839

VARNISH COMPOSITIONS

Victor H. Turkington, Caldwell, N. J., assignor to Bakelite Corporation, New York, N. Y., a corporation of Delaware No Drawing. Application June 22, 1934, Serial No. 731,973

10 Claims. (Cl. 134—26)

The present invention relates to varnish compositions, and is particularly directed to compositions characterized by containing a fatty oil, an oil-soluble resin and a phenolic ester of a polybasic carboxylic acid, and to a method for making such compositions.

It has been found that compounds of the class of phenolic esters of polybasic carboxylic acids, although normally insoluble or only sparingly soluble in oils, can by proper treatment be incorporated in oil varnish compositions in the presence of oil-soluble resins, particularly oil-soluble phenolic resins, and that the resulting compositions have highly desirable properties, as will be more fully set forth hereinafter.

The phenolic esters which are suitable for use in the present invention embrace broadly phenolic esters of polybasic organic carboxylic acids. Illustrative examples of acids which may form a component of such esters are phthalic acid, succinic acid, and maleic acid. Illustrative examples of the phenol components of the esters are phenol, cresol, and the higher alkylated phenols, alkyl and aralkyl esters of hydroxy benzoic acids, benzyl-phenols, phenyl-phenols and α- and β-naphthol.

For the purpose of illustration the following examples of compositions embodying the principles of the invention, and of their method of production, will be given.

Example 1.—Thirty parts of tung oil, thirty parts of an oil-soluble phenolic resin, such as may be produced by reacting o-phenyl-phenol with a reactive methylene-containing body such as formaldehyde, and twenty parts of the reaction product obtained by heating two mols of methyl salicylate with one mol. of o-phthalyl chloride, are heated together to about 540° F. in 30 to 40 minutes. The mixture is held at this temperature for about 25 minutes. It is then cooled to 400° F. and 100 parts of xylol are added. When cold, drier may be added, for example two ounces to the gallon of a drier containing 0.1 gram of cobalt and 0.8 gram of lead per liquid ounce.

Example 2.—Thirty-five parts of tung oil, fifty parts of an oil-soluble phenolic resin, and fifteen parts of the reaction product of one mol. of phenol, one mol. of methyl salicylate and one mol. of o-phthalyl chloride are heated together as in Example 1. When well incorporated the mixture is cooled and ninety parts of petroleum thinner and ten parts of xylol are added. When cold drier may be added as in Example 1.

The tung oil of the foregoing examples may be replaced in whole or in part by linseed oil, castor-oil, soy-bean oil or other drying, semi-drying or non-drying fatty oil.

Although the phenol esters of polybasic organic acids are in general insoluble or only slightly soluble in drying or semi-drying oils, compositions made by heating the phenol esters with oils in the presence of oil-soluble resins retain the phenol esters on cooling without separation.

The oil-soluble phenolic resins are of particular advantage in this invention, but they may be replaced in whole or in part by other oil-soluble resinous material such as oil-soluble alkyd resins, for example, the fatty acid or fatty oil modified alkyd resins, rosin ester gum and copals.

The varnish compositions of the invention have a number of highly desirable properties attributable to the presence of the phenol esters. They have a very high durability, shown particularly by the striking retention of gloss on exposure of the varnish film to atmospheric conditions. They have a greatly enhanced pigment wetting power. The varnish film shows an increased flexibility and an enhanced resistance to oil.

Varnish compositions produced in accordance with the invention may be used either as air-drying or baking varnishes.

The varnish compositions of the invention are also useful in the production of cellulose ester lacquers. The new compositions have been found to be compatible with the cellulose esters in lacquer compositions and give increased water and alkali resistance to the lacquer film.

I claim:

1. Process of making varnish compositions which comprises heating together a drying oil, an oil-soluble synthetic resin, and a neutral phenol ester of a dibasic carboxylic acid.

2. Process of making varnish compositions which comprises heating together a drying oil, an oil-soluble phenolic resin, and a neutral phenol ester of a dibasic carboxylic acid.

3. Process of making varnish compositions which comprises heating together a drying oil, an oil-soluble phenolic resin, and a neutral phenol ester of phthalic acid.

4. Process of making varnish compositions which comprises heating together a drying oil, an oil-soluble phenolic resin, and the reaction product of o-phthalyl chloride and an alkyl ester of salicylic acid.

5. Process of making varnish compositions which comprises heating together a drying oil, an oil-soluble phenolic resin, and the reaction product of o-phthalyl chloride, an alkyl ester of salicylic acid and another phenol.

6. A varnish composition including a drying oil, an oil-soluble synthetic resin, and a neutral phenol ester of a dibasic carboxylic acid.

7. A varnish composition including a drying oil, an oil-soluble phenolic resin, and a neutral phenol ester of a dibasic carboxylic acid.

8. A varnish composition including a drying oil, an oil-soluble phenolic resin, and a neutral phenol ester of phthalic acid.

9. A varnish composition including a drying oil, an oil-soluble phenolic resin, and the reaction product of o-phthalyl chloride and an alkyl ester of salicylic acid.

10. A varnish composition including a drying oil, an oil-soluble phenolic resin, and the reaction product of o-phthalyl chloride, an alkyl ester of salicylic acid and another phenol.

VICTOR H. TURKINGTON.